United States Patent
Sakai et al.

(10) Patent No.: US 7,883,586 B2
(45) Date of Patent: Feb. 8, 2011

(54) METHOD FOR PRODUCTION AND APPARATUS FOR PRODUCTION OF GRAIN-ORIENTED ELECTRICAL STEEL SHEET EXCELLENT IN MAGNETIC PROPERTIES

(75) Inventors: Tatsuhiko Sakai, Futtsu (JP); Hideyuki Hamamura, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 12/084,352

(22) PCT Filed: Aug. 29, 2006

(86) PCT No.: PCT/JP2006/317402

§ 371 (c)(1),
(2), (4) Date: Apr. 29, 2008

(87) PCT Pub. No.: WO2007/052406

PCT Pub. Date: May 10, 2007

(65) Prior Publication Data

US 2009/0107585 A1 Apr. 30, 2009

(30) Foreign Application Priority Data

Nov. 1, 2005 (JP) .............................. 2005-318656

(51) Int. Cl.
*H01F 1/04* (2006.01)
*H01F 1/00* (2006.01)
(52) U.S. Cl. ........................................ 148/111; 148/121
(58) Field of Classification Search .................. 148/111, 148/121; *H01F 1/00, 1/08*
See application file for complete search history.

(56) References Cited

U.S. PATENT DOCUMENTS 6,331,692 B1 12/2001 Krause et al.
6,368,424 B1 * 4/2002 Sakai et al. ................ 148/111

FOREIGN PATENT DOCUMENTS

EP 0 102 732 A2 3/1984
EP 0 429 706 A1 6/1991
EP 0 897 016 A1 2/1999

(Continued)

OTHER PUBLICATIONS

Extended European Search Report dated Jul. 28, 2009 issued in corresponding European Application No. 06 79 7329.

*Primary Examiner*—Jessica L Ward
*Assistant Examiner*—Alexander Polyansky
(74) *Attorney, Agent, or Firm*—Kenyon & Kenyon LLP

(57) ABSTRACT

Technology scanning and irradiating grain-oriented electrical steel sheet moving in a rolling direction at a speed Vl with an elliptical spot formed by a laser beam in the width direction at Vc to improve the core loss of the grain-oriented electrical steel sheet, which adjusts the angle $\theta s$ formed by the scan direction of the elliptical beam and the long axis of the ellipse based on the equation $\theta s = \tan^{-1}(Vl/Vc)$ and which constructs the system for adjusting the $\theta s$ by an optical system for laser irradiation comprised of a cylindrical lens telescope, scan mirror, and fθ lens arranged in that order, a system for changing the angle of the cylindrical lens telescope with respect to the scan direction of the scan mirror, and a system for changing the distance between lenses.

1 Claim, 4 Drawing Sheets

FOREIGN PATENT DOCUMENTS

| | | |
|---|---|---|
| JP | 62-93095 A | 4/1987 |
| JP | 1-306089 A | 12/1989 |
| JP | 06-191128 B | 3/1994 |
| JP | 2003-129135 A | 5/2003 |
| WO | WO 2004/08465 A1 | 9/2004 |

* cited by examiner (a) t=0

(b) t=tn (c) t=ts

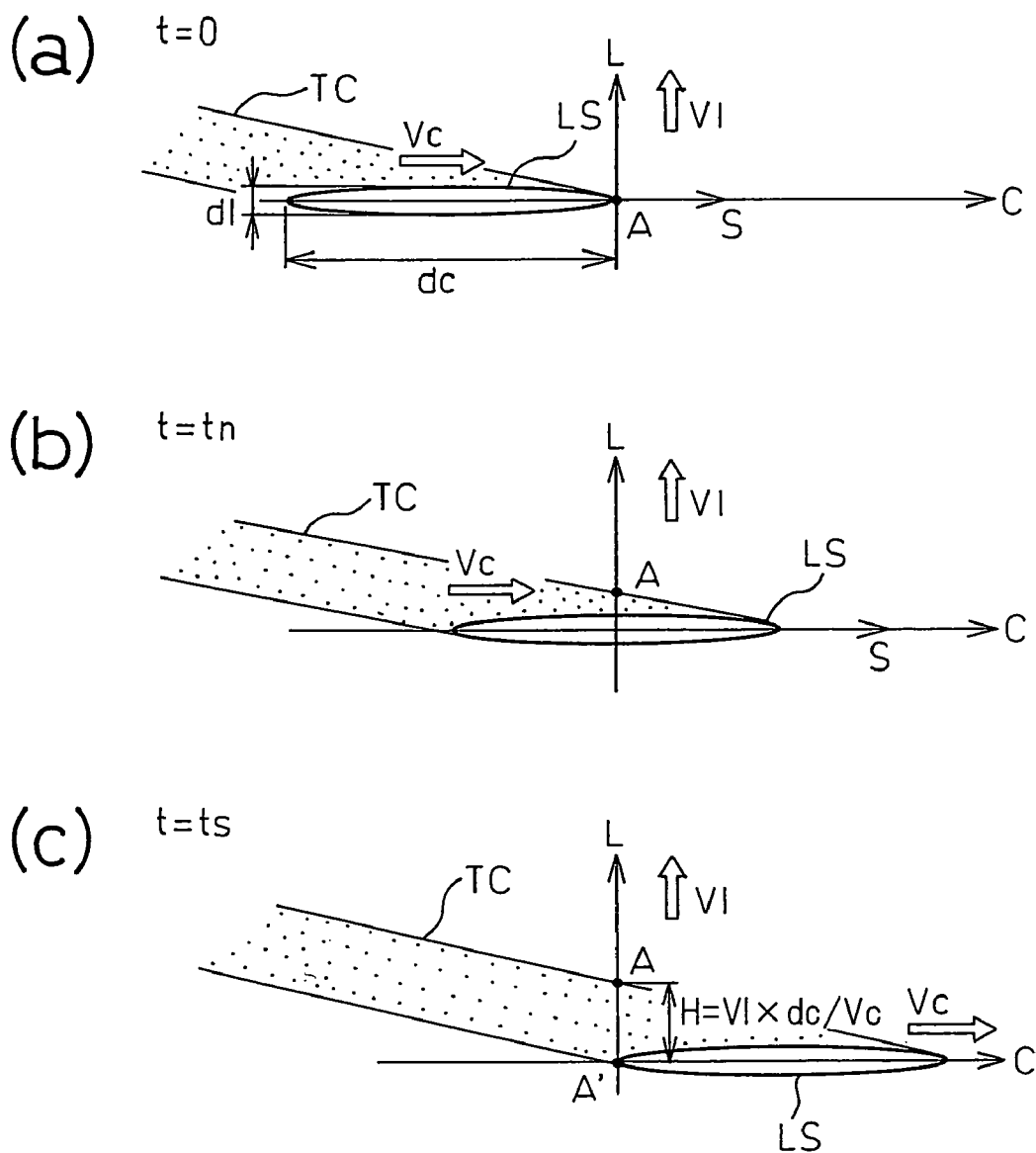

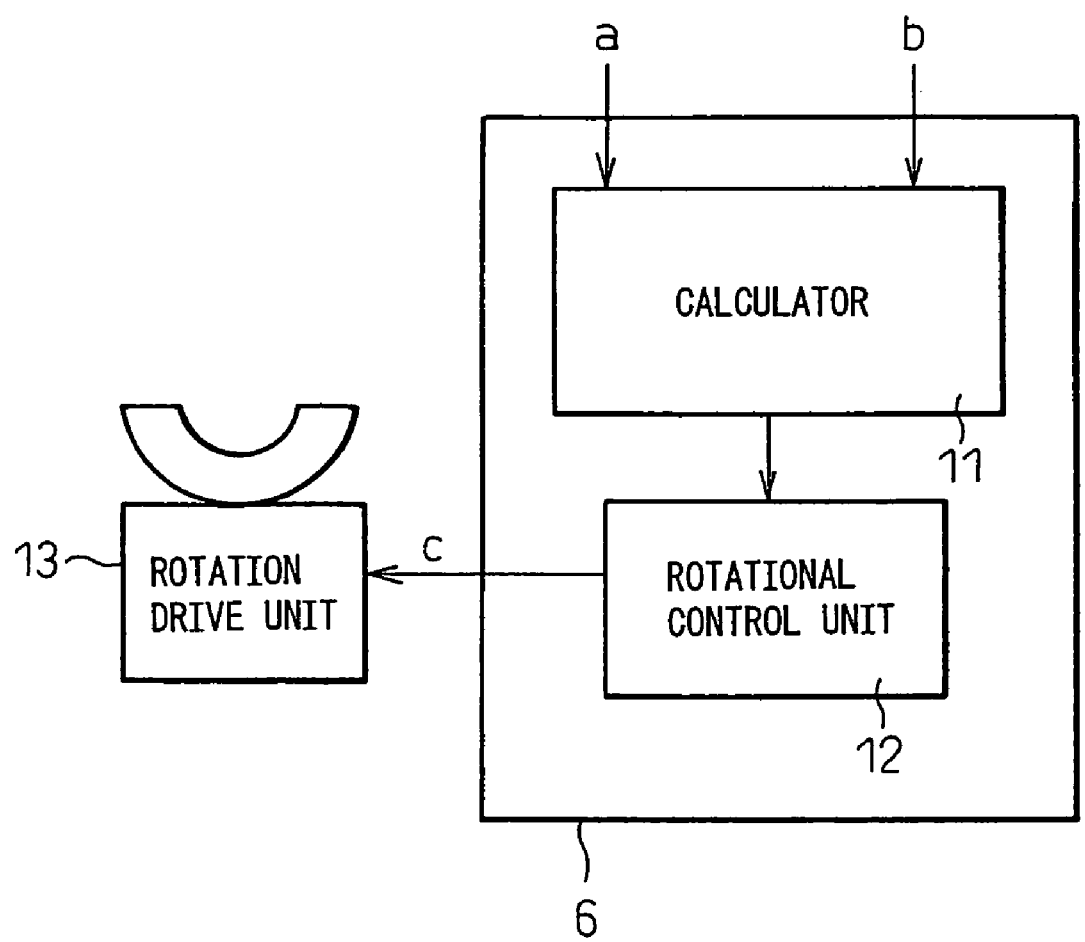

METHOD FOR PRODUCTION AND APPARATUS FOR PRODUCTION OF GRAIN-ORIENTED ELECTRICAL STEEL SHEET EXCELLENT IN MAGNETIC PROPERTIES

TECHNICAL FIELD

The present invention relates to technology for production of grain-oriented electrical steel sheet irradiating the surface of grain-oriented electrical steel sheet with a laser beam to improve its magnetic properties, more particularly relates to technology suitable for the case or producing grain-oriented electrical steel sheet by a high speed production line speed.

BACKGROUND ART

Electrical steel sheet with axes of easy magnetization of crystals aligned in substantially the same direction in the steel sheet as a whole is called "grain-oriented electrical steel sheet". The direction of the axes of easy magnetization matches with the rolling direction of the steel sheet. This steel sheet is extremely superior as a material for a transformer core with a constant magnetization direction.

The core loss when magnetizing grain-oriented electrical steel sheet by alternating current is divided into eddy current loss and hysteresis loss. The eddy current loss is further divided into classic eddy current loss and abnormal eddy current loss. Classic eddy current loss is proportional to the thickness of the steel sheet, so is reduced by making the thickness of the material smaller. Abnormal eddy current loss is loss due to the large eddy current locally generated due to movement of the domain walls and becomes smaller proportional to the distance between domain walls of 180° magnetic domains long in the rolling direction. Therefore, various techniques have been devised for increasing the fineness of the magnetic domains to lower the core loss.

By giving periodic stress in a linear form substantially vertical to the rolling direction and in the rolling direction near the surface of the steel sheet, the distance between 180° domain walls becomes narrower.

Therefore, for example, as disclosed in Japanese Patent Publication (B2) No. 6-19112, the method has been devised of scanning and irradiating a steel sheet in the width direction by a focused laser beam to impart stress to the steel sheet and is currently in actual use.

This method of control of magnetic domains by laser is a method of using strain and stress to reduce the core loss. This is not accompanied with changes in the shape of the electrical steel sheet as with formation of melted parts or grooves, so if performing stress relief annealing, the stress imparting effect disappears. However, when not performing stress relief annealing, a 10% or higher effect of improvement of the core loss is easily obtained, so the electrical steel sheet produced by this method is in extremely high demand as a material for a stacked transformer not including annealing in the production process.

On the other hand, hysteresis loss is loss due to the magnetization curve, that is, the hysteresis curve, that is, the core loss component sensitive to the stress of the steel sheet. Therefore, impartation of stress by laser irradiation has the problem that it leads to an increase in the hysteresis loss.

Therefore, to suppress the unnecessary stress to the maximum, it can be said to be desirable to introduce effective stress in as narrow a region as possible. For example, in the art disclosed in WO2004/083465, by making the size of the focused spot on the electrical steel sheet in the rolling direction not more than 0.2 mm, stress is imparted to a narrow region and superior properties are obtained.

However if making the focused size smaller while leaving it circular, the power density of the focused spot increases, but the time during which the focused spot passes over any point on the steel sheet, that is, the beam residence time of the beam size divided by the scan speed, becomes shorter. The beam passes before almost any transfer of heat occurs in the thickness direction of the steel sheet.

In such a case, heat excessively enters just the extreme surface layer of the steel sheet. In some cases, the surface layer melts. However, almost no heat is transferred in the depth direction of the sheet thickness, so the heat elevated region is limited to near the surface, so there is the problem that it not possible to sufficiently introduce into the steel sheet the stress required for making the magnetic domains finer.

Therefore, as disclosed in WO2004/083465, the method of making the shape of the focused spot an ellipse long in the scan direction of the beam may be considered. In this method, while leaving the stress width of the rolling direction narrow, the power density can be suppressed and the beam residence time on the irradiated point can be increased, sufficient stress can be given in the steel sheet thickness direction, and an excellent core loss property can be obtained.

However, if using the technique of making the shape of the focused spot an ellipse long in the scan direction of the beam in a production facility where the steel sheet moves in the rolling direction at a high speed, the following problem arises.

FIG. 3 gives schematic views showing, in the technique of focusing a laser beam on a steel sheet into a focused spot LS with a short rolling direction size dl and a long width direction size dc (hereinafter referred to as an "elliptical spot") and making that spot scan the steel sheet in the direction C approximately vertical to the rolling direction L at a speed Vc so as irradiate the steel sheet with a laser beam, the position of the elliptical spot LS and the laser beam-induced damage TC left on the steel sheet in the case of aligning the long axis direction of the elliptical spot with the scan direction C and the steel sheet moving in the rolling direction L by the speed V1.

In this case, if assuming that the front end of the beam passes through a point A on the steel sheet at the time t=0, then when the tail end of the beam passes near the point A at the time t=ts, the point A has already moved by exactly H in the rolling direction due to movement of the steel sheet and the tail end of the beam passes the point A'.

Therefore, the laser beam-induced damage TC on the steel sheet, that is, the path along which the steel sheet actually receives the laser beam, as shown in FIG. 3, is slanted by an angle θ proportional to the ratio of Vl and Vc and has a width proportional to H.

That is, even if making the short axis dl of the elliptical beam extremely small to lower the core loss, when the steel sheet is moving at a high speed, the effective laser irradiated width actually received by the steel sheet has a width proportional to H and the effective laser irradiated width cannot be made narrower. Further, H is expressed by Vl×dc/Vc, so the effect of the speed of movement of the steel sheet becomes larger when the rolling direction line speed Vl of the steel sheet is large, that is, when the production speed is slow.

Further, if aiming at better improvement of the magnetic properties and giving the elliptical beam a finer short axis, it is necessary to make the long axis longer so as to keep down the power density. As a result, the beam residence time becomes longer, so the effect of the movement of the steel sheet on the effective laser irradiated width becomes greater. That is, there was the problem that the effect becomes greater the better the magnetic properties and the higher the production capability in the production facilities.

DISCLOSURE OF THE INVENTION

Therefore, the present invention provides technology for improvement of magnetic properties reducing the core loss by irradiating electrical steel sheet with a laser beam which is characterized as follows for stably reducing the core loss even when making the focused spot of the laser beam narrower on a high speed production line.

In the first aspect of the present invention, there is provided a method of production of grain-oriented electrical steel sheet focusing a laser beam to an elliptical spot on grain-oriented electrical steel sheet moving at a predetermined speed and scanning and irradiating the grain-oriented electrical steel sheet in the width direction by the focused elliptical spot to improve the magnetic properties, the method of production of grain-oriented electrical steel sheet characterized by providing a slant angle θs between the scan direction of the elliptical spot and the long axis direction of the elliptical spot when scanning and irradiating the sheet by the laser beam.

Further, the first aspect is characterized by adjusting the slant angle θs so that the laser irradiated width on the grain-oriented electrical steel sheet becomes smaller in accordance with a production line speed Vl of the grain-oriented electrical steel sheet and a scan speed Vc of the elliptical spot of the laser beam on the grain-oriented electrical steel sheet and is further characterized by finding the slant angle θs from the speeds Vl and Vc based on the following equation (1) and adjusting the long axis direction of the elliptical spot based on the found θs value:

$$\theta s = \tan^{-1}(Vl/Vc) \quad (1)$$

Further, the first aspect is characterized by adjusting the production line speed Vl of the grain-oriented electrical steel sheet or the scan speed Vc of the elliptical spot of the laser beam on the grain-oriented electrical steel sheet in accordance with the slant angle θs so that the laser irradiated width on the grain-oriented electrical steel sheet becomes smaller and further is characterized by finding the speed Vc from the speed Vl and the slant angle θs based on the following equation (2) and adjusting the scan speed of the elliptical spot based on the found Vc value and by finding the speed Vl from the speed Vc and the slant angle θs based on the following equation (3) and adjusting the production line speed based on the found Vl value:

$$Vc = Vl/\tan \theta s \quad (2)$$

$$Vl = Vc \times \tan \theta s \quad (3)$$

In a second aspect of the present invention, there is provided an apparatus for production of grain-oriented electrical steel sheet excellent in magnetic properties focusing a laser beam in an elliptical spot on the grain-oriented electrical steel sheet and scanning and irradiating the grain-oriented electrical steel sheet in the width direction by the focused elliptical spot to improve the magnetic properties, the apparatus for production of grain-oriented electrical steel sheet provided with:

an elliptical beam shaping unit for shaping the laser beam into an elliptical shape, a beam scanning unit for deflecting and scanning the elliptical beam emitted from the elliptical beam shaping unit, a beam focusing unit for focusing the scan beam emitted from the beam scanning unit in an elliptical spot on the grain-oriented electrical steel sheet, and an elliptical slant angle adjustment mechanism adjusting a long axis direction of the elliptical spot to be inclined by a slant angle θs with respect to a scan direction of the elliptical spot.

Further, the second aspect is characterized in that the elliptical beam shaping unit has a cylindrical lens telescope comprised of two cylindrical lenses matching in generatrix direction and a lens distance adjustment mechanism for changing the distance between the two cylindrical lenses for changing the long axis length of the elliptical spot and further is characterized in that the elliptical slant angle adjustment mechanism has a rotation support unit supporting the cylindrical lens telescope changeable in slant angle about the direction of progression of the laser beam as the rotational axis and a rotation drive unit for driving rotation of the rotation support unit.

In a third aspect of the present invention, there is provided an apparatus for production of grain-oriented electrical steel sheet excellent in magnetic properties focusing a laser beam in an elliptical spot on grain-oriented electrical steel sheet and scanning and irradiating the grain-oriented electrical steel sheet in the width direction by the focused elliptical spot to improve the magnetic properties, the apparatus for production of grain-oriented electrical steel sheet provided with:

an elliptical beam shaping unit for shaping the laser beam into an elliptical shape, a beam scanning unit for deflecting and scanning the elliptical beam emitted from the elliptical beam shaping unit, a beam focusing unit for focusing the scan beam emitted from the beam scanning unit in an elliptical spot on the grain-oriented electrical steel sheet, an elliptical slant angle adjustment mechanism adjusting a long axis direction of the elliptical spot to be inclined by a slant angle θs with respect to a scan direction of the elliptical spot, and an elliptical slant angle control unit controlling the elliptical slant angle adjustment mechanism in accordance with a production line speed Vl of the grain-oriented electrical steel sheet and the scan speed Vc of the elliptical spot on the grain-oriented electrical steel sheet to adjust the slant angle θs to a slant angle whereby the laser irradiated width on the grain-oriented electrical steel sheet becomes smaller.

Further, the third aspect is characterized in that the elliptical slant angle control unit has a calculation unit receiving the Vl and Vc as input signals and calculating and outputting the slant angle θs based on the above equation (1) and a drive control unit controlling the drive operation of the elliptical slant angle adjustment mechanism based on the output slant angle θs and is characterized in that the elliptical beam shaping unit has a cylindrical lens telescope comprised of two cylindrical lenses matching in generatrix direction and a lens interval adjustment mechanism for changing the interval between the two cylindrical lenses for changing the long axis length of the elliptical spot; the elliptical slant angle adjustment mechanism has a rotation support unit supporting the cylindrical lens telescope changeable in slant angle about the direction of progression of the laser beam as the rotational axis and a rotation drive unit for driving rotation of the rotation support unit; and the elliptical slant angle control unit controls the drive operation of the rotation drive unit of the elliptical slant angle adjustment mechanism.

According to the present invention, the point passed by the elliptical beam scanned in the width direction can move along with movement of the steel sheet in the rolling direction and the width of the laser reception point on the steel sheet can be made to substantially match the short axis length of the ellipse. As a result, the increase in the effective laser irradiated width due to the high speed movement of the steel sheet is suppressed, so it is possible to produce grain-oriented electrical steel sheet excellent in magnetic properties at all times regardless of the line speed in the rolling direction of the steel sheet and further the focused shape of the beam.

BRIEF DESCRIPTION OF THE DRAWINGS

FIG. 3 gives schematic views of a conventional method of scanning by an elliptical spot.

FIG. 4 is a block diagram of an example of an elliptical slant angle control system.

BEST MODE FOR CARRYING OUT THE INVENTION

An embodiment of the present invention will be explained in detail with reference to the drawings.

Figure 1:
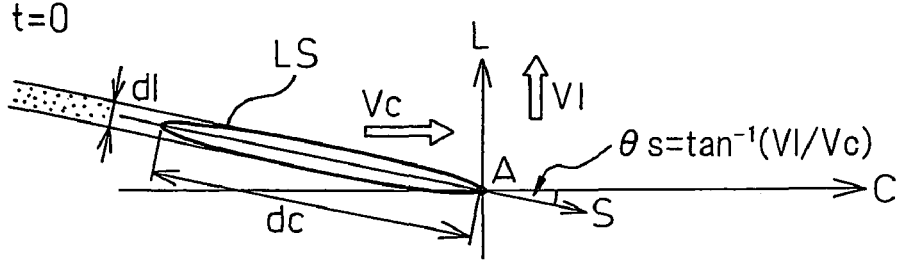
FIG. 1 gives explanatory views of the angular arrangement of the elliptical spot of the laser beam and the scan direction of the elliptical spot in the present invention.
Figure 1:
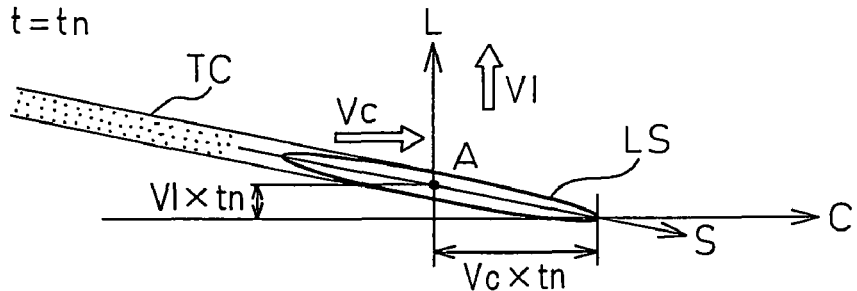
Figure 1:
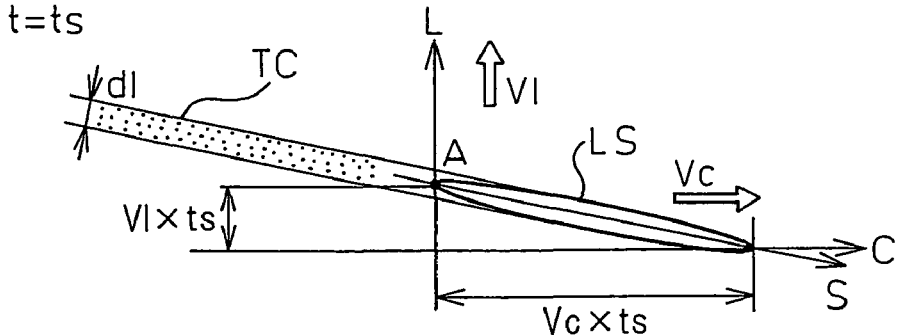

FIG. 1 gives schematic views of the state of movement of the elliptical spot LS and a point on the electrical steel sheet (designated as the "beam reception point A") along with the elapse of time and the induced damage Tc of the laser beam remaining on the steel sheet when scanning an electrical steel sheet moving at the production line speed Vl above the paper surface by an elliptical spot LS of a laser beam at a speed Vc along the scan direction axis C and shows the arrangement of the point A and the elliptical spot LS (a) when the front end of the beam starts to pass the point A at the time t=0 and (c) when the tail end of the beam passes it at t=ts. (b) shows the arrangement at any time tn between them.

As shown in FIG. 1, the elliptical spot LS is arranged so that its long axis S forms a slant angle $\theta s$ with respect to the scan direction axis C of the elliptical spot.

Here, the slant angle $\theta s$ is set to a value given by equation (1) in accordance with the line speed Vl of the electrical steel sheet and the scan speed Vc of the laser beam:

$$\theta s = \tan^{-1}(Vl/Vc) \quad (1)$$

By setting the slant angle $\theta s$ in this way, as shown in FIGS. 1(a), (b), and (c), the position of passage of the elliptical spot also moves along with movement of the beam reception point A along with the elapse of time, so the beam reception point A receives the value of the short axis length dl of the substantially elliptical spot as the beam focused size at all times while the elliptical spot is passing, and the steel sheet is scanned by a laser beam irradiated width equal to the short axis length dl.

This holds true if setting the slant angle $\theta s$ based on equation (1), even if the line speed Vl of the steel sheet is high and, further, even if the focused size dl of the laser beam becomes extremely small. Therefore, even in a facility having a high line speed, the effectiveness of focusing by a narrow focused size is maintained, and electrical steel sheet excellent in core loss property can be produced.

Note that the slant angle $\theta s$ is set based on the equation (1), but the width of the damage of the laser beam left on the steel sheet is preferably 0.1 mm or less to obtain the effect of improvement of the core loss, more preferably is 0.08 mm or less, still more preferably is 0.06 mm. If considering the fact that the short axis length of the elliptical spot usually used is 0.05 mm or so, there is no need for setting the slant angle $\theta s$ strictly according to equation (1). It should be set based on the slant angle $\theta s$ obtained by the equation (1) so that the width of the laser beam-induced damage remaining on the steel sheet becomes 0.08 mm or less.

Above, the method of setting the slant angle $\theta s$ (long axis direction of elliptical spot) in accordance with the production line speed Vl and the scan speed Vc of the elliptical spot was explained, but the present invention is not limited to this.

It is possible to reduce the laser irradiated width on the grain-oriented electrical steel sheet by adjusting the production line speed Vl or scan speed Vc of the elliptical spot without changing the slant angle $\theta s$ (long axis direction of elliptical spot).

That is, when changing the production line speed Vl, the new scan speed Vc of the elliptical spot is found from the current slant angle $\theta s$ based on the following equation (2) and the production line speed Vl and the scan speed of the elliptical spot to be changed are adjusted based on the found Vc value.

$$Vc = Vl/\tan \theta s \quad (2)$$

Further, in the same way as the case of changing the scan speed Vc of the elliptical spot, the new production line speed Vl is found by the following equation (3) and the production line speed is adjusted based on the found Vl value:

$$Vl = Vc \times \tan \theta s \quad (3)$$

Figure 2:
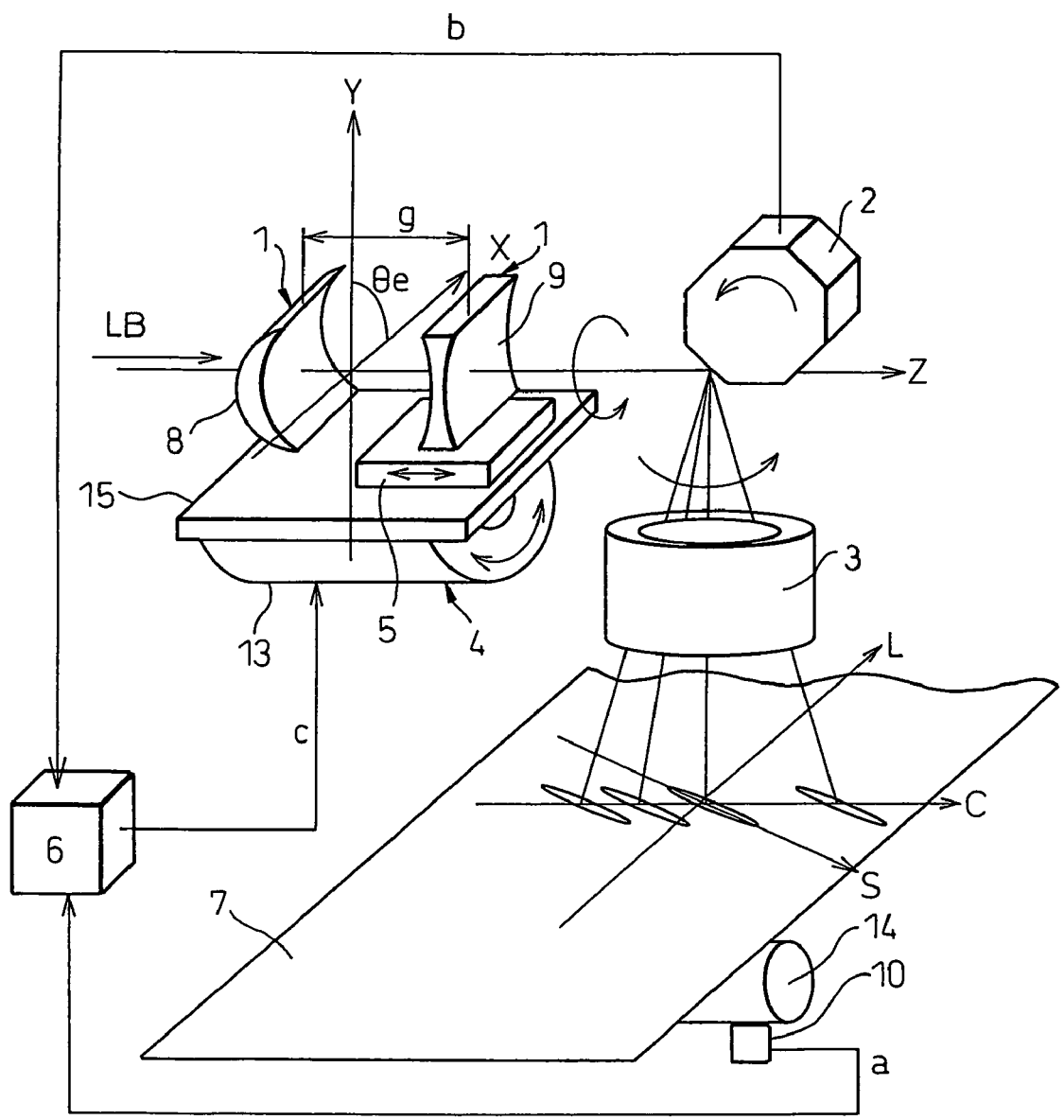
FIG. 2 shows an example of the arrangement of optical components of a system for production of grain-oriented electrical steel sheet excellent in magnetic properties of the present invention.

Next, an example of an embodiment of an apparatus for producing grain-oriented electrical steel sheet scanning electrical steel sheet by an elliptical spot at a slant will be explained using FIG. 2.

The present embodiment is basically configured by a cylindrical lens telescope 1 combining a convex cylindrical lens 8 and a concave cylindrical lens 9 as an elliptical beam shaping unit for shaping the laser beam into an ellipse, a rotary polygon mirror 2 as a beam scan unit reflecting, deflecting, and scanning a laser beam, and an fθ lens 3 as a beam focusing unit focusing the scan beam on a specific plane. The optical parts are arranged along the optical axis Z in this order.

The generatrices of the lens surfaces of the cylindrical lenses 8 and 9 match with the X-axis. The laser beam LB output from the laser apparatus (not shown) is shaped by the cylindrical lenses 8 and 9. The beam emitted from the cylindrical lenses converges or diverges in only the Y-axial direction perpendicular to the X-axis. The cylindrical lens telescope 1 can be rotated by the slant angle adjustment mechanism 4 about the Z-axis (direction of progression of laser beam LB) to change the slant angle. The slant angle adjustment mechanism 4 is comprised of a rotary support 15 movably supporting the cylindrical lens telescope 1 and a rotation drive unit 13 driving the rotation of the rotary support 15. Further, the lens interval adjustment mechanism 5 has the function of changing the distance between lenses and adjusting the shape of the elliptical spot.

The laser beam is reflected and deflected by the rotating polygon mirror 2 and focused and made to scan the electrical steel sheet 7 by the fθ lens 3.

The focused size in the direction on the steel sheet corresponding to the X-axial direction of the cylindrical lens 8 and 9 is determined only by the focal distance f of the fθ lens. On the other hand, the focused size in the direction of the steel sheet corresponding to the Y-axial direction of the cylindrical lens is determined by combination of the divergence or convergence by the cylindrical lens telescope 1 and the focal distance f of the fθ lens 3. Therefore, the focused spot shape becomes a focused size different in the XY-axial direction of the cylindrical lenses or an elliptical spot.

In the present invention, the slant angle adjustment mechanism 4 provided at the cylindrical lens telescope 1 enables the change of the slant angle θs formed by the long axis direction S of the ellipse with respect to the scan direction C of the elliptical spot. That is, it is possible to adjust the long axis direction S by the coordinates on the steel sheet. In the above configuration of the apparatus, the scan direction C of the elliptical spot is determined by the rotational direction of the rotating polygon mirror 2. If there is information on the production line speed V1 of the steel sheet and the scan speed Vc of the elliptical spot, the slant angle θs can be found from equation (1) and θs can be set based on that value.

Further, in this embodiment, as the elliptical beam shaping unit, a cylindrical lens telescope using two cylindrical lenses is used, but the object of this unit is to give divergence and convergence of only the Y-direction to the beam. A single cylindrical lens or a combination of three or more lenses may also be used. Further, instead of cylindrical lenses, it is possible to use cylindrical mirrors.

By changing the distance g between the lenses of the cylindrical lens telescope 1 in the present invention by the lens distance adjustment mechanism 5, the convergence or divergence angle of the beam emitted from the cylindrical lens changes. The length dc of the elliptical spot in the long axis direction can be adjusted by this mechanism, so it is possible to change the effective beam residence time ts=dc/Vc on the steel sheet. The effective residence time ts has an effect on the heating and cooling properties of the steel sheet, so enables adjustment of the amount of stress given to the steel sheet. By introducing more suitable stress, it is possible to suppress the hysteresis loss, reduce the eddy current loss, and improve the magnetic properties.

Next, another embodiment of an apparatus for production of grain-oriented electrical steel sheet of the present invention will be explained using FIG. 2 and FIG. 4.

The above embodiment is effective when the steel sheet is moving in the rolling direction L at a constant speed, speed of movement V1 of the steel sheet in the actual sheet running direction (L direction) or the scan speed Vc of the elliptical spot sometimes fluctuates. This embodiment is for dynamically adjusting the slant angle θs formed by the elliptical beam long axis direction and the scan direction, without fixing it, in accordance with fluctuations of V1 and Vc.

In this embodiment, as shown in FIG. 4, the speed V1 value of the production line of the production line facility is detected based on for example the production line speed signal a of the rotary detector 10 of the transport roll 14 of the electrical steel sheet 7, while the beam scan speed Vc value is detected by the rotational speed scan speed signal b of the rotary mirror 2. Further, the rotational speed signal a and the rotational speed signal b are input to calculate the suitable slant angle θs by the calculator 11 using equation (1). The operation of the rotation drive unit 13 of the slant angle adjustment mechanism 4 is controlled by a control signal C from the rotation control unit 12 using this slant angle θs as the target value so as to rotate the beam shaping unit on the rotary support 15 and adjust the direction of the long axis of the elliptical beam. The calculator 11 and the rotation control unit 12 are combined to form the elliptical slant angle control unit 6. Note that the elliptical slant angle control unit 6 may be stored in a single housing or may be split.

Examples

Examples of the core loss property of electrical steel sheet after laser irradiation are shown in Table 1 comparing the case of application of the method and apparatus of the present invention and the other case.

The shape of the focused spot of the elliptical beam in this embodiment is an elliptical long axis dc=1.0 mm and short axis dl=0.05 mm. The scan speed is Vc=30 m/s, while the rolling direction speed of the steel sheet is V1=1.5 m/s. The laser power is 300 W, while the rolling direction pitch of the irradiated beam is 5 mm.

In Table 1, B8 is the magnetic flux density of the steel sheet occurring at a 800 A/m magnetization force. W17/50 is the core loss at a frequency of 50 Hz of alternating current excitation and a maximum magnetic flux density of 1.7 T. The comparative example shows the core loss property in the case of irradiating the laser while matching the beam scan direction and the long axis direction of the ellipse without applying the method of the present invention. Further, the example shows the core loss property in the case of making the angle formed by the ellipse long axis and scan direction θs=tan−1 (V1/Vc)=2.86° in accordance with the present invention.

Here, the core loss value W17/50 is the maximum core loss value in a 1.7 T, 50 Hz AC magnetic field. Further, "B8" is the magnitude of the magnetic flux density occurring when applying a magnetic field of 0.8 A/m in a material before laser irradiation and is an indicator showing the crystal orientation of the material. Further, this value does not change much at all after irradiation by a laser.

As shown in Table 1, for the same material, a lower core loss property was obtained by the method using the present invention. In the comparative example, the effective irradiated beam width received by the steel sheet was 0.1 mm or about 2 times the original beam width. On the other hand, the effective width in the case of the present invention was substantially 0.05 mm. Therefore, in the present invention giving the finer stress, the increase of the hysteresis loss was suppressed and a low core loss was obtained.

TABLE 1

| | B8 (T) Before laser irradiation (material) | W17/50 (W/kg) | |
|---|---|---|---|
| | | Before laser irradiation | After laser irradiation |
| Comparative Example | 1.91 | 0.86 | 0.76 |
| Example | 1.91 | 0.86 | 0.73 |

INDUSTRIAL APPLICABILITY

When irradiating the surface of grain-oriented electrical steel sheet by a laser beam to improve its magnetic properties, according to the present invention, even if making the steel sheet move at a high speed, an increase in the effective laser irradiated width due to this is suppressed, so there is the advantageous effect in industry that it is possible to constantly stably produce grain-oriented electrical steel sheet excellent in magnetic properties regardless of the line speed of the steel sheet in the rolling direction or the focused shape of the beam.

The invention claimed is:

1. A method of production of a grain-oriented electrical steel sheet excellent in magnetic properties, comprising focusing a laser beam in an elliptical spot having constant long axis and short axis on said grain-oriented electrical steel sheet, said grain-oriented electrical steel sheet moving at a predetermined speed, and scanning and irradiating the grain-oriented electrical steel sheet in the width direction by the focused elliptical spot to improve the magnetic properties, said method of production of grain-oriented electrical steel sheet characterized by providing a slant angle θs between a scan direction of said elliptical spot and a long axis direction of the elliptical spot, wherein said slant angle θs is determined in accordance with a production line speed Vl of the grain-oriented electrical steel sheet and a scan speed Vc of the elliptical spot of the laser beam on the grain-oriented electrical steel sheet, based on the following equation (1):

$$\theta s = \tan^{-1}(Vl/Vc) \tag{1}$$

* * * * *